(12) United States Patent
Kim

(10) Patent No.: US 11,022,181 B2
(45) Date of Patent: Jun. 1, 2021

(54) STEERING APPARATUS FOR VEHICLE

(71) Applicant: Mando Corporation, Pyeongtaek-si (KR)

(72) Inventor: Hyun Kim, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 348 days.

(21) Appl. No.: 15/993,330

(22) Filed: May 30, 2018

(65) Prior Publication Data

US 2018/0347635 A1    Dec. 6, 2018

(30) Foreign Application Priority Data

Jun. 5, 2017 (KR) .......................... 10-2017-0069510

(51) Int. Cl.
| | |
|---|---|
| *F16D 3/06* | (2006.01) |
| *F16D 1/10* | (2006.01) |
| *B62D 1/20* | (2006.01) |
| *B62D 1/19* | (2006.01) |
| *F16D 3/40* | (2006.01) |

(52) U.S. Cl.
CPC ................. *F16D 3/06* (2013.01); *B62D 1/20* (2013.01); *F16D 1/10* (2013.01); *F16D 3/065* (2013.01); *B62D 1/192* (2013.01); *F16D 3/40* (2013.01)

(58) Field of Classification Search
CPC ... F16D 3/06; F16D 3/065; F16D 1/10; F16D 3/40; B62D 1/20; B62D 1/192
USPC .................................. 464/162, 167; 280/777
See application file for complete search history.

(56) References Cited

U.S. PATENT DOCUMENTS

| | | | | |
|---|---|---|---|---|
| 3,479,902 | A | * | 11/1969 | Okamoto ............... B62D 1/192 |
| 4,125,000 | A | * | 11/1978 | Grob ....................... F16D 3/848 |
| | | | | 464/162 |
| 5,464,251 | A | | 11/1995 | Daumal Castellon |
| 6,099,036 | A | | 8/2000 | Fujiu et al. |
| 6,241,616 | B1 | | 6/2001 | Lightcap |
| 8,434,788 | B2 | | 5/2013 | Becker et al. |

(Continued)

FOREIGN PATENT DOCUMENTS

| | | |
|---|---|---|
| CN | 103303357 A | 9/2013 |
| DE | 19504036 C1 | 6/1996 |

(Continued)

OTHER PUBLICATIONS

Chinese Office Action dated Jan. 21, 2021, in connection with the Chinese Patent Application No. 201810567154.7.

(Continued)

*Primary Examiner* — Greg Binda
(74) *Attorney, Agent, or Firm* — Hauptman Ham, LLP

(57) ABSTRACT

A steering apparatus for a vehicle includes a shaft member having several outer axial grooves provided on an outer circumferential surface of a sliding section; a first outer member having a hollow shape; and a second outer member having a hollow shape. The first outer member has first serration portions axially formed on an outer circumferential surface thereof and several inner axial grooves formed on an inner circumferential surface thereof to correspond to the outer axial grooves of the shaft member. The second outer member has second serration portions axially provided on an inner circumferential surface thereof to correspond to the first serration portions of the first outer member.

10 Claims, 13 Drawing Sheets

(56) References Cited

U.S. PATENT DOCUMENTS

| | | | |
|---|---|---|---|
| 10,619,666 B2 * | 4/2020 | Muntener | ............... F16C 29/04 |
| 2005/0075174 A1 | 4/2005 | Fraher | |

FOREIGN PATENT DOCUMENTS

| | | |
|---|---|---|
| DE | 19715744 A1 | 10/1997 |
| DE | 19826014 A1 | 2/1999 |
| DE | 102011007647 A1 | 11/2011 |
| DE | 102014017555 A1 | 6/2016 |
| EP | 0726192 B1 | 4/1999 |
| EP | 1717127 A2 | 11/2006 |
| FR | 2727372 A1 | 5/1996 |
| KR | 10-1498651 B1 | 3/2015 |
| KR | 10-2017-0052710 A | 5/2017 |

OTHER PUBLICATIONS

German Office Action for corresponding German Application No. 10 2018 113 037.6 dated Apr. 15, 2021, citing the above reference(s) with English Machine Translation.

Korean Office Action for corresponding Korean Application No. 10-2017-0069510 dated Mar. 16, 2021, with English Machine Translation.

* cited by examiner

STEERING APPARATUS FOR VEHICLE

CROSS REFERENCE TO RELATED APPLICATION

This application claims priority from Korean Patent Application No. 10-2017-0069510, filed on Jun. 5, 2017, which is hereby incorporated by reference for all purposes as if fully set forth herein.

BACKGROUND OF THE INVENTION

1. Field of the Invention

Embodiments disclosed herein relate to a steering apparatus for a vehicle. More particularly, the present disclosure relates to a steering apparatus for a vehicle (hereinafter, also be referred to as a "vehicular steering apparatus"), in which, when the vehicle is in a collision, a shrinkage amount of the full length of an intermediate shaft is increased, thereby enabling the intermediate shaft to sufficiently collapse, so that more impact energy can be absorbed, and the entire volume of the intermediate shaft is reduced to facilitate the movement thereof in assembly processes and the amount of products supplied to an assembly line is increased, so that the number of assembly processed can be reduced.

2. Description of the Prior Art

Generally, in a vehicular steering apparatus, when a driver rotates a steering wheel in a desired direction, a steering shaft connected to the steering wheel is rotated, and the steering shaft transmits a rotational force to a gearbox including a rack gear and a pinion gear, through an intermediate shaft connected thereto via a universal joint and a slip joint.

In this case, the gear box converts the rotational motion of the steering shaft into a linear motion by the rack gear and the pinion gear, and transfers the motion to a rack bar. The rack bar transmits the force to a tie rod connected to a knuckle of a tire, so that the advancing direction of the vehicle can be changed.

In particular, since the intermediate shaft between the steering shaft and the gear box has a structure inclined at a predetermined angle with respect to the steering shaft and the gear box rather than coaxially coinciding with the steering shaft and the gear box, the intermediate shaft cannot transmit power through a general shaft coupling method. Thus, it is necessary to use a universal joint, which allows the steering shaft to be changed to a predetermined angle.

However, the intermediate shaft of such a conventional vehicle steering apparatus has a structure in which the outer member and the inner member are slid with respect to each other so as to be extended or contracted. However, since the length in which the intermediate shaft is contracted when the vehicle is in a collision is limited to half of the remaining length excluding the overlapping length of the outer member and the inner member. Thus, it is difficult to secure a collapse distance capable of absorbing collision energy.

Further, since the entire volume of the intermediate shaft is large due to the limitation of the axial extension and contraction amount of the intermediate shaft, the movement of the intermediate shaft in assembly steps is inconvenient. Further, since the number of products supplied to the assembly line is small, the number of assembly steps is increased.

SUMMARY OF THE INVENTION

The present disclosure has been made in order to solve the above-mentioned problems. An aspect of the present disclosure is to provide a steering apparatus for a vehicle, in which, when the vehicle is in a collision, the contraction amount of the full length of an intermediate shaft is increased, thereby enabling the intermediate shaft to sufficiently collapse, so that more impact energy can be absorbed, and the entire volume of the intermediate shaft is reduced to facilitate the movement thereof in assembly processes and the amount of products supplied to an assembly line is increased, so that the number of assembly processes can be decreased.

Further, the aspect of the present disclosure is not limited thereto, and other unmentioned aspects of the present disclosure may be clearly appreciated by those skilled in the art from the following descriptions.

In order to achieve such an aspect, embodiments disclosed herein provides an intermediate shaft for a vehicular steering apparatus including: a shaft member having a yoke provided at one end thereof and several outer axial grooves provided on an outer circumferential surface of a sliding section; a first outer member having a hollow shape, wherein a remaining end of the shaft member is slidably inserted into one end of the first outer member and the first outer member has first serration portions axially formed on an outer circumferential surface of a remaining end thereof and several inner axial grooves formed on an inner circumferential surface thereof to correspond to the outer axial grooves of the shaft member; and a second outer member having a hollow shape, wherein the remaining end of the first outer member is slidably inserted into one end of the second outer member, and the second outer member has second serration portions axially provided on an inner circumferential surface thereof to correspond to the first serration portions of the first outer member, and a yoke provided on the remaining end thereof.

According to the embodiments having the structure and shape described above, when the vehicle is in a collision, the contraction amount of the entire length of the intermediate shaft is increased compared to a conventional one, and thus collapse can be sufficiently performed, thereby absorbing more impact energy.

Further, according to the embodiments, the axial extension or contraction amount of the intermediate shaft is increased compared with a conventional one, and thus the entire volume of the intermediate shaft becomes smaller, so that the movement in an assembling process can be facilitated and the number of products supplied to an assembly line can be increased, so that the assembly process can be shortened.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
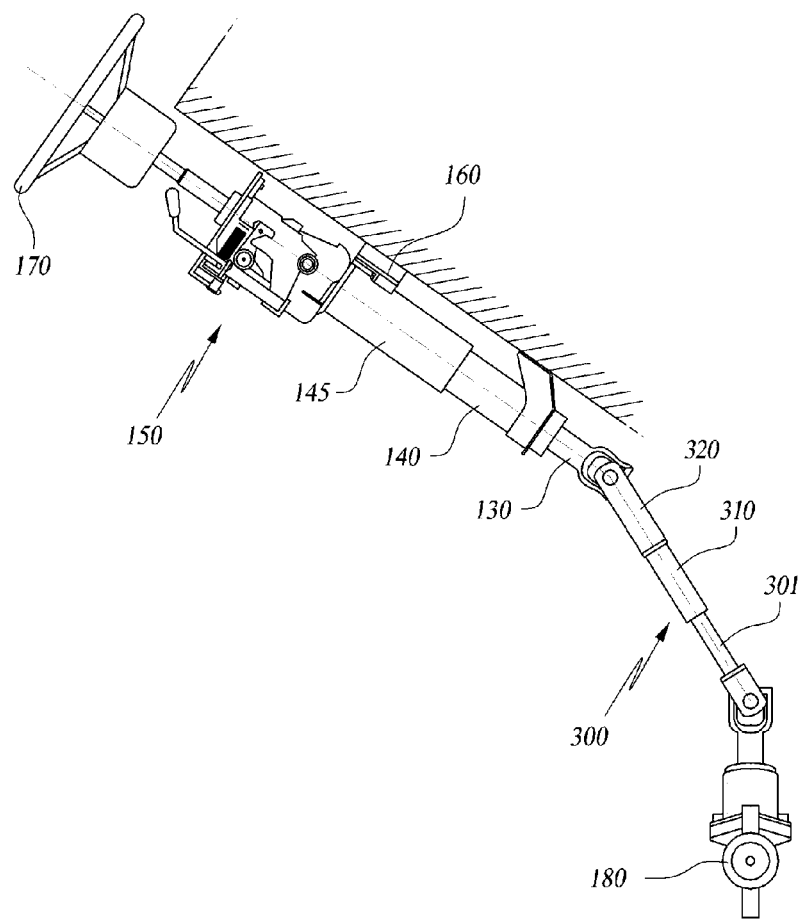
FIG. 1 is a schematic view illustrating a vehicular steering apparatus according to embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

As illustrated in these figures, the vehicular steering apparatus according to the embodiments includes: a shaft member 301 having a yoke 115 provided at one end thereof and several outer axial grooves 303 provided on an outer circumferential surface of a sliding section; a first outer member 310 having a hollow shape, in which the other end of the shaft member 301 is slidably inserted into one end of the first outer member 310 and the first outer member has first axial serration portions 319 formed on the outer circumferential surface of the other end thereof and several inner axial grooves 312 provided on the inner circumferential surface thereof to correspond to the outer axial grooves 303; and a second outer member 320 having a hollow shape, in which the other end of the first outer member 310 is slidably inserted into one end of the second outer member 320, and the second outer member 320 has second axial serration portions 329 provided on the inner circumferential surface thereof to correspond to the first serration portions 319 of the first outer member 310 and an yoke 115 provided on the other end thereof.

Referring to FIG. 1, in the vehicular steering apparatus, the lower end of the steering shaft 130 is connected to a gear box 180 via an intermediate shaft 300. Since the intermediate shaft 300 is configured to be connected to the gear box 180 in the state of being inclined at an arbitrary angle due to a surrounding condition, a universal joint 110 is used in order to satisfy such a condition.

Here, the intermediate shaft 300 includes the universal joint 110 connected to a steering shaft 130, the shaft member 301, the first outer member 310, the second outer member 320, etc., so that the intermediate shaft 300 is able to transfer a rotational force even in the state of being bent to form a predetermined angle with the steering shaft 130.

One side of the intermediate shaft 300 is connected to the steering shaft 130 coupled to the steering wheel 170 and the other side is connected to the gear box 180 so as to transmit a rotational force generated from the steering wheel 170 to a vehicle wheel via the gear box 180.

The steering column 150 includes an outer tube 145, an inner tube 140, and a mounting bracket 160. The outer tube 145 is formed on the steering wheel 170 side and the inner tube 140, which has a diameter smaller than that of the outer tube 145, is provided in the outer tube 145 so as to be insertable into the inside of the outer tube 145 at the time of impact. The outer tube 145 and the inner tube 140 are formed in the form of hollow tubes so that the steering shaft 130 can rotate smoothly.

The rotational motion applied by the driver's operation of the steering wheel 170 is transmitted to the rack bar (not illustrated) through the steering shaft 130 of the steering column 150, the intermediate shaft 300, and the gear box, and is converted into the rectilinear motion of the rack bar, thereby steering vehicle wheels. The intermediate shaft 300 is connected in the state of being bent at a predetermined angle from the steering shaft to the gear box due to the internal installation structure thereof in the vehicle, and transmits the rotation of the steering shaft to the gear box.

In order to ensure that the intermediate shaft 300 transmits a rotational force at the time of operating of the steering wheel by the driver and absorbs collision energy while being collapsed to be contracted when the the vehicle is in a collision, the intermediate shaft 300 includes a shaft member 301, a first outer member 310, and a second outer member 320, which are telescopically coupled to each other so as to be extendable/contractable while sliding axially.

In addition, since the intermediate shaft 300 is coupled with the steering shaft and the gear box while being bent at a predetermined angle, the both ends or one end of the intermediate shaft 300 are connected to the steering shaft and the gear box via a universal joint 110, which is constituted with two yokes 115 and one spider 117.

However, in the detailed description of the embodiments, it will be described that the shaft member 301, the first outer member 310, and the second outer member 320 are shaft connecting members between the steering shaft 130 and the gear box 180, either of which may be coupled with the steering shaft 130 irrespective of the coupling direction, and the yokes 115 and the spider 117 are coupled to the shaft member 301 and the second outer member 320.

One end of the shaft member 301 is coupled with the yoke 115, and the shaft member 301 is provided with several outer axial grooves 303 provided on the outer circumferential surface of the sliding section, one end of which is inserted into the first outer member 310. Although the yoke 115 and the shaft member 301 are illustrated as being coupled to each other in the figure, the present disclosure is not necessarily limited thereto and the yoke 115 and the shaft member 301 may be formed integrally with each other.

The other end of the shaft member 301 is slidably inserted into one end of the first outer member 310, and the first outer member 310, which is formed in a hollow shape, has several inner axial grooves 312 provided on the inner circumferential surface thereof so as to correspond to the outer axial grooves 303 of the shaft member 301.

Thus, a bush 330, which includes several balls 330a provided on the body 330b thereof so as to be rolled, may be coupled between the shaft member 301 and the first outer member 310, and the rolling motion of the balls 330a disposed between the outer axial grooves 303 and the inner axial grooves 312 is performed when the shaft member 301 slides.

In addition, axial first serration portions 319 are formed on the other end of the first outer member 310 and are inserted into the inside of the second outer member 320 to be slidable in the axial direction.

The other end of the first outer member 310 is slidably inserted into one end of the second outer member 320, and the second outer member 320, which is formed in a hollow shape, has axial second serration portions 329 provided on the inner circumferential surface thereof to correspond to the first serration portions 319. The other end of the second outer member 320 is provided with a yoke 115 so as to be connected to the steering shaft by the yoke 115. Although the figures illustrate the second outer member 320 and the yoke 115 as being formed integrally with each other, the yoke 115 is not limited thereto and may be separately formed and coupled to the second outer member 320.

Here, the second outer member 320 may be provided with a compressive plastic deformation portion 321, which presses the outer circumferential surface of the portion where the second serration portions 329 are formed toward the center portion in the radial direction so as to plastically deform the outer circumferential surface.

That is, by providing at least one compressive plastic deformation portion 321 at each of symmetrical positions on both sides in the radial direction with respect to the center of the second outer member 320, the second serration portions 329 formed on the inner circumferential surface of the second outer member 320 are finely plastically deformed inwardly.

Accordingly, when a collapse motion in which the first outer member 310 is inserted into the second outer member 320 is performed due to the collision of the vehicle, the sliding coupling force between the second serration portions 329 and the first serration portions 319 is slightly increased, thereby absorbing the collapse load.

Figure 2:
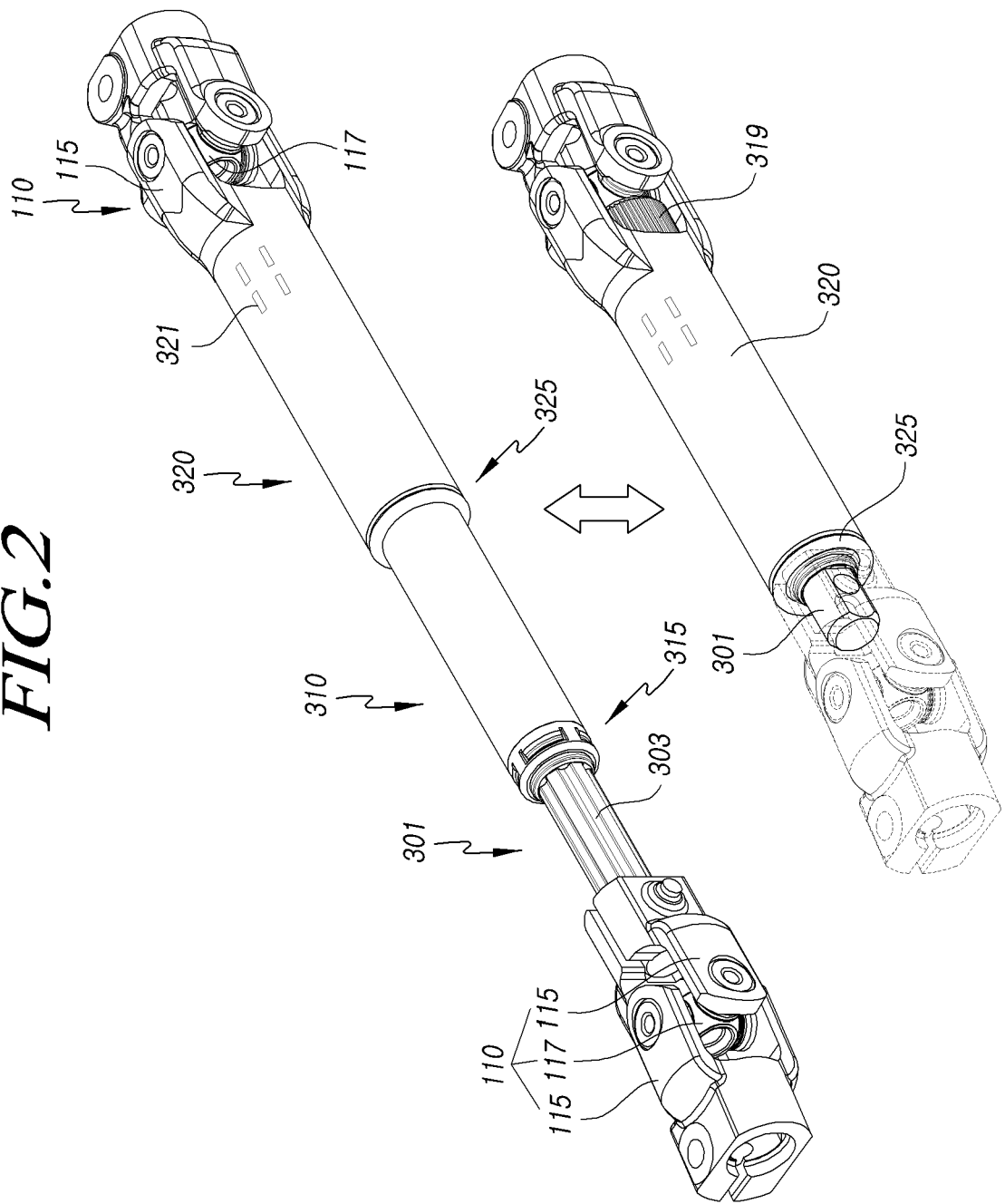
FIG. 2 is a perspective view illustrating extension and contraction states of the vehicular steering apparatus according to the embodiments.
Figure 3:
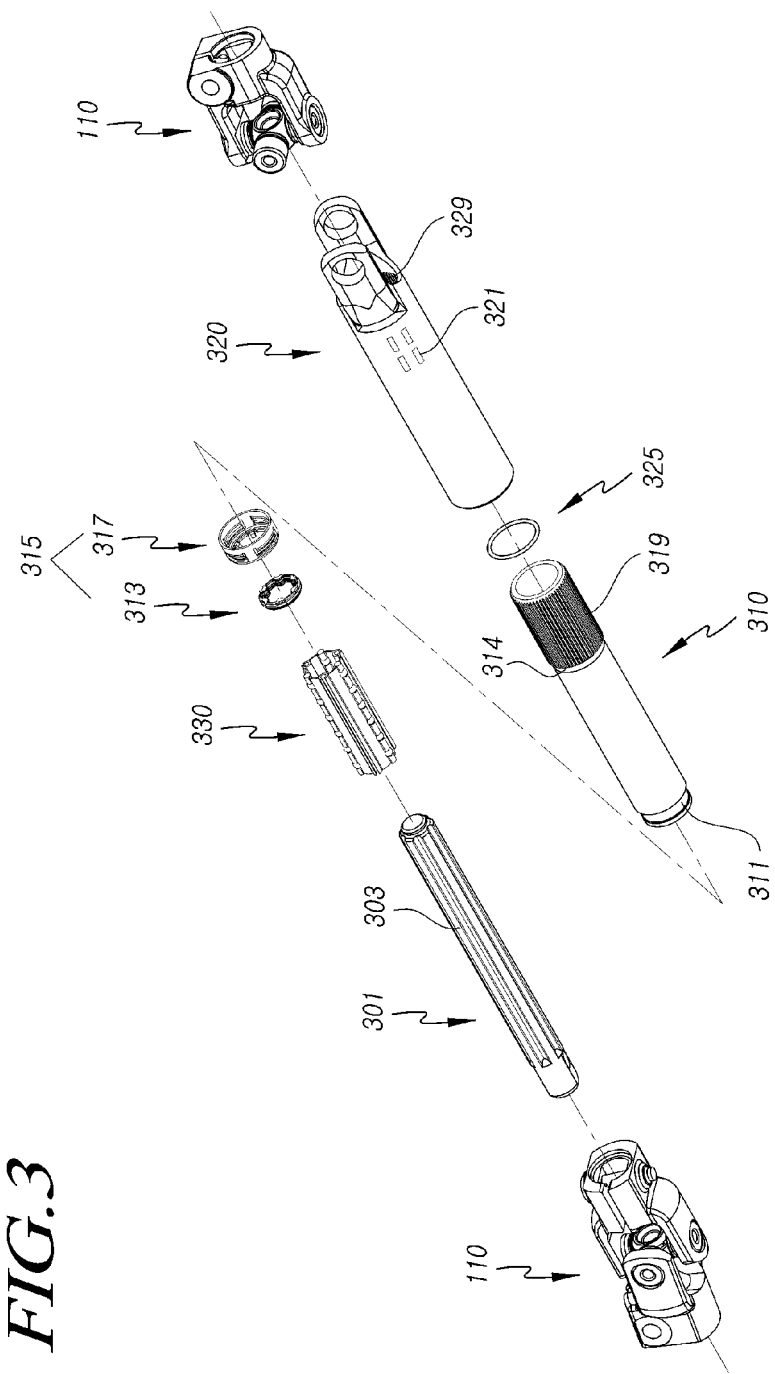
FIG. 3 is an exploded perspective view illustrating the vehicular steering apparatus according to the embodiments.
Figure 4:
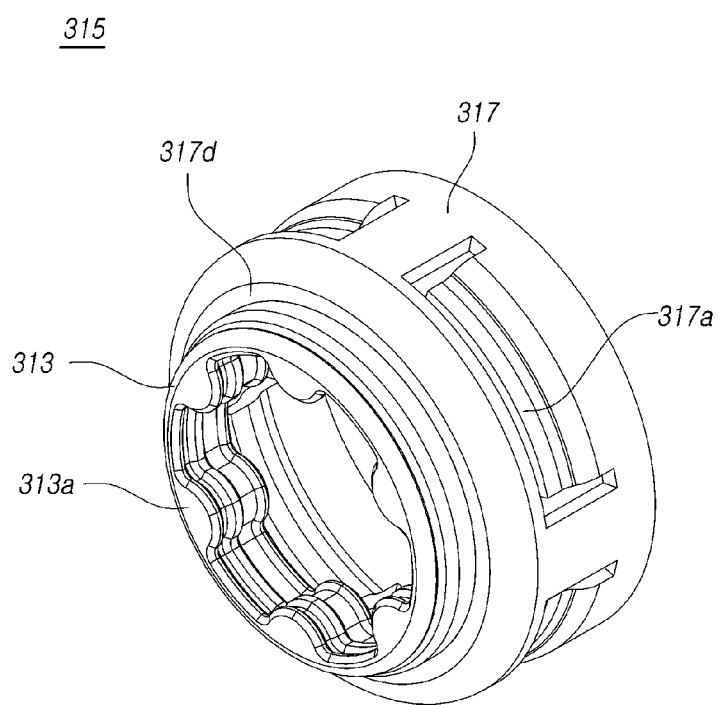
FIGS. 4 and 5 are perspective views each illustrating a vehicular steering apparatus according to the embodiments.
Figure 5:
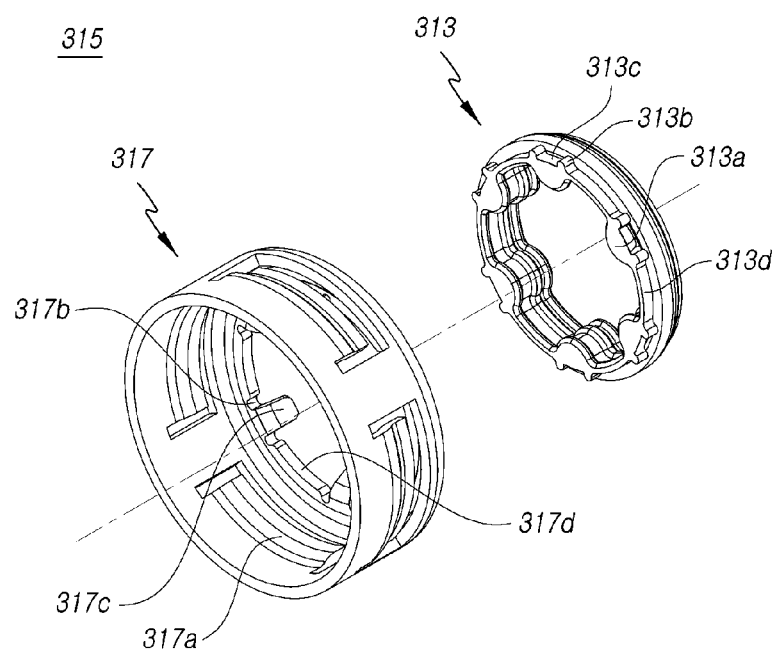
Figure 6:
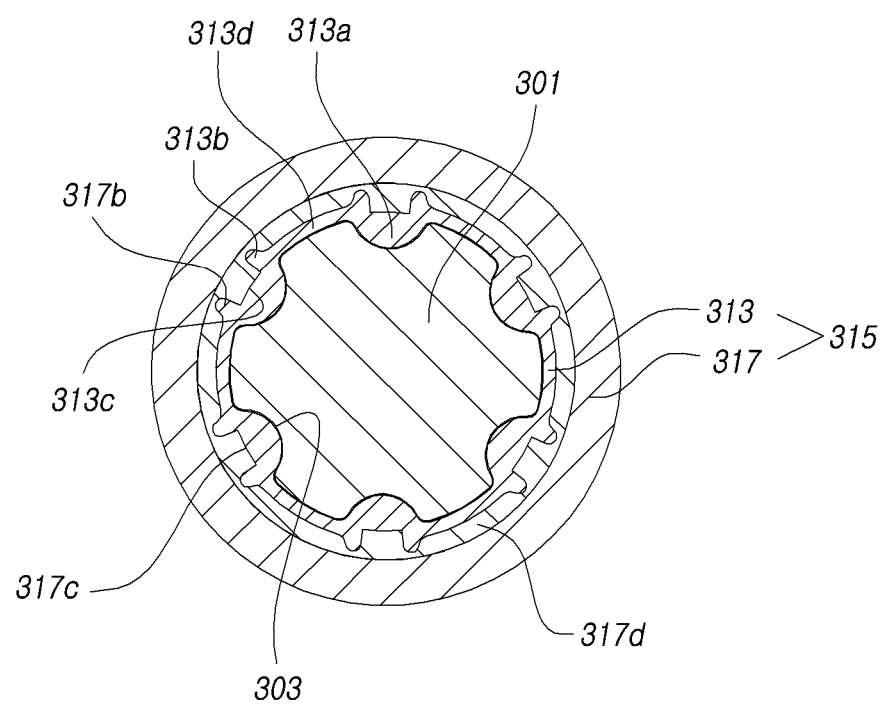
FIGS. 6 to 8 are cross-sectional views each illustrating the vehicular steering apparatus according to the embodiments.
Figure 7:
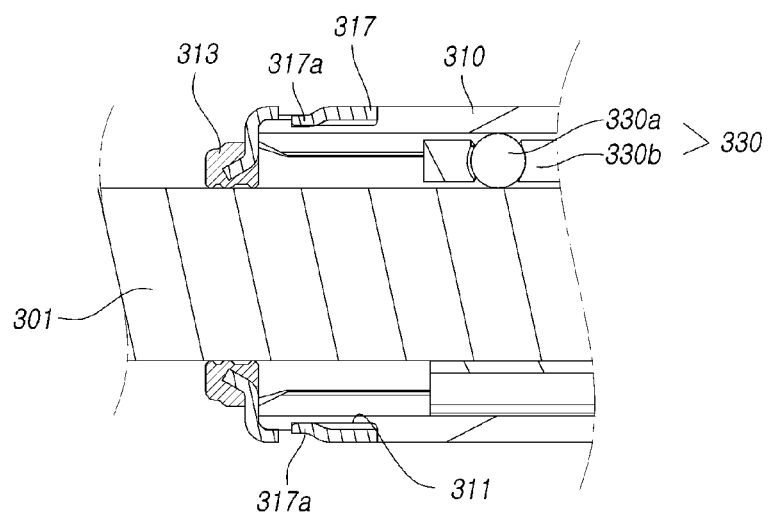
Figure 8:
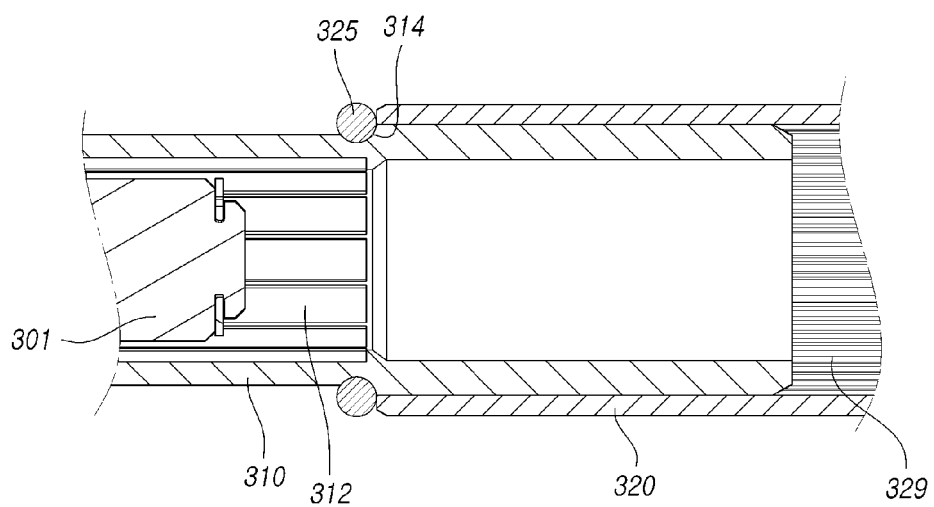
Figure 9:
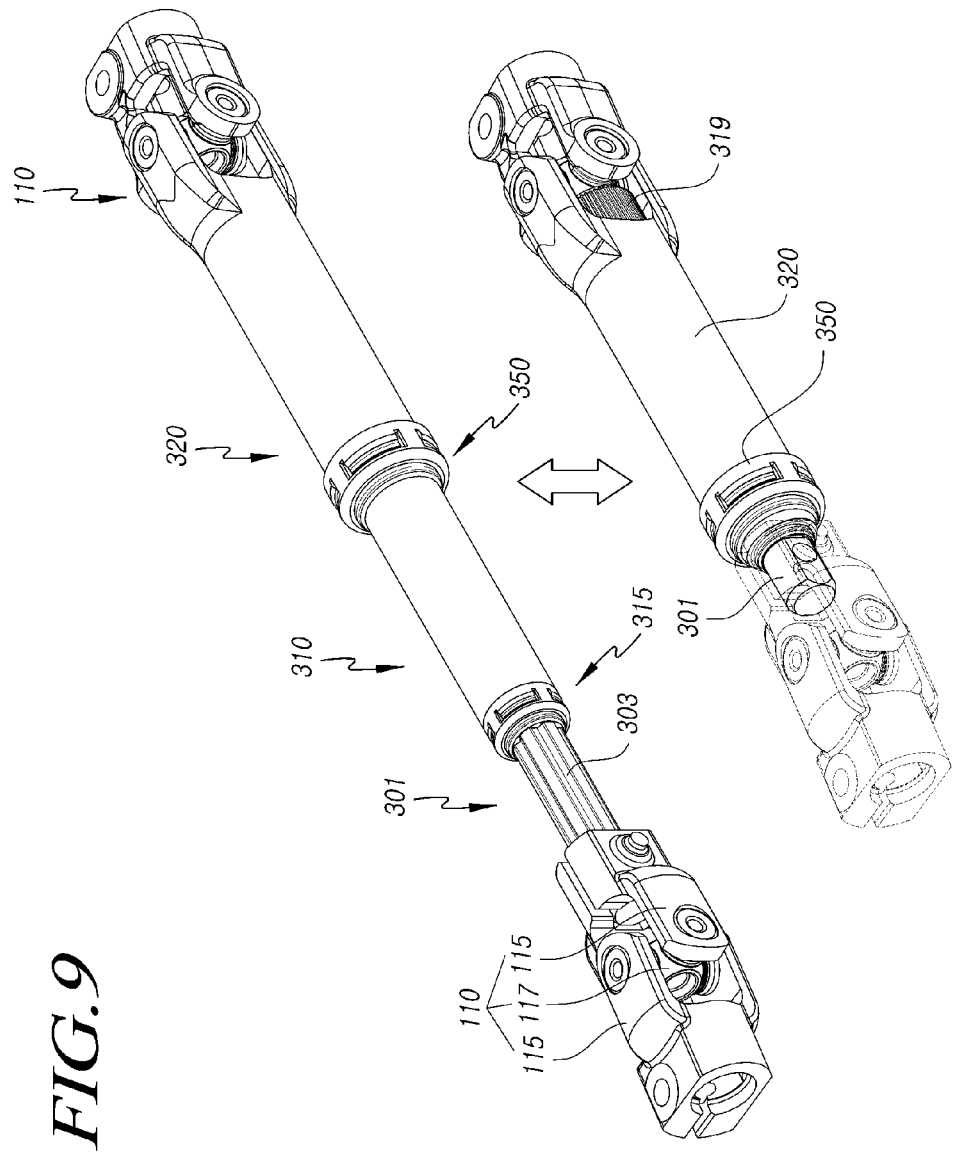
FIG. 9 is a perspective view illustrating extension and contraction states of the vehicular steering apparatus according to the embodiments.
Figure 10:
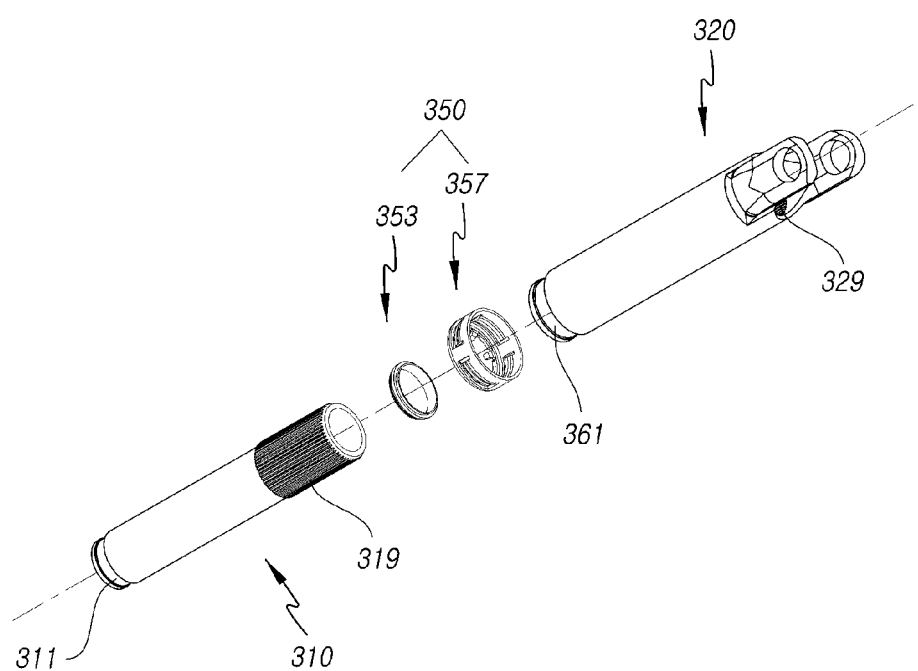
FIG. 10 is an exploded perspective view illustrating the vehicular steering apparatus according to the embodiments.
Figure 11:
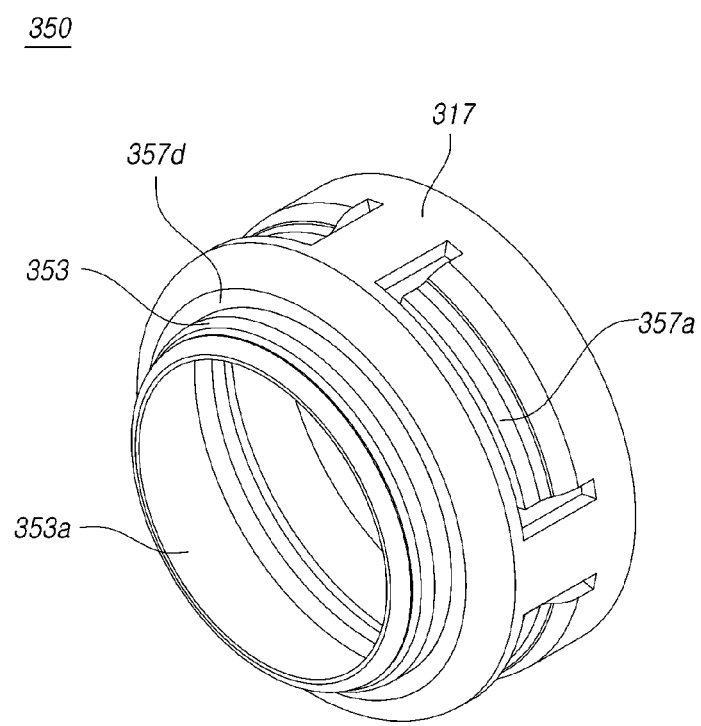
FIGS. 11 and 12 are perspective views each illustrating the vehicular steering apparatus according to the embodiments.
Figure 12:
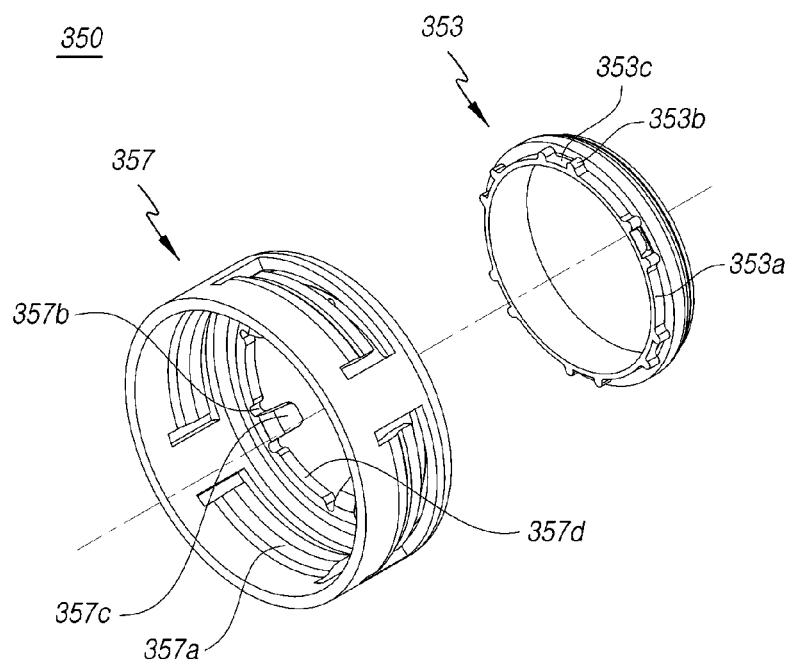
Figure 13:
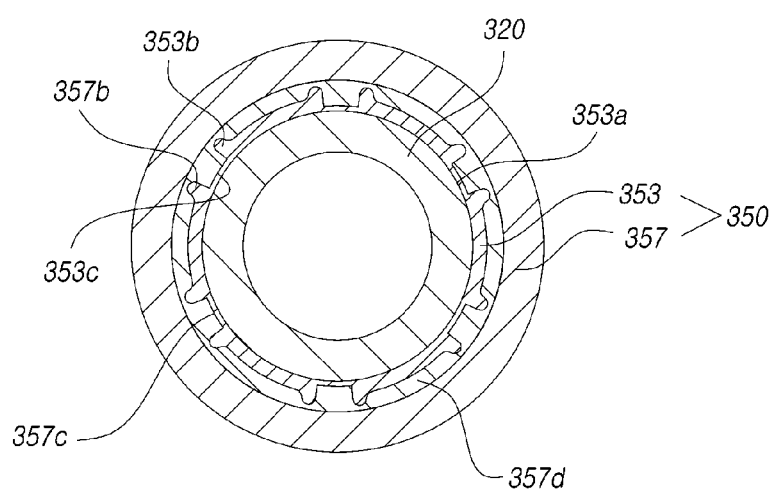
FIG. 13 is a cross-sectional view illustrating the vehicular steering apparatus according to the embodiments.

As described above, the compressive plastic deformation portion 321 is provided at each of symmetrical positions on both sides in the radial direction with respect to the center portion of the second outer member 320. FIGS. 2 and 3 illustrate four compressive plastic deformation portions 321 on one side in the radial direction by way of an example, and the number and positions of the compressive plastic deformation portions 321 may be controlled depending on the type of the vehicle and a collision characteristic.

Further, in the present embodiments, a first load control member 315 may be further included for controlling the collapse load of the shaft member 301 and the first outer member 310 when the vehicle is in a collision.

That is, the first load control member 315 is coupled to one end of the first outer member 310, and when the collapse motion in which the shaft member 301 is inserted into the first outer member 310 is performed due to the collision of the vehicle, the first load control member 315 is in close contact with and is supported by the outer axial grooves 303 of the shaft member 301, thereby controlling the collapse load.

The first load control member 315 includes an annular contact member 313 having contact protrusions 313a provided on the inner circumferential surface thereof to be in close contact with and to be supported by the outer axial grooves 303 of the shaft member 301, and an annular support member 317, one end of which is coupled to the outer circumferential side of the contact member 313 and the other end of which is coupled to the outer circumferential surface of the first outer member 310.

The contact member 313 has contact protrusions 313a protruding in the radial direction on the inner circumferential surface thereof so as to be in close contact with the outer axial grooves 303 of the shaft member 301, so that impurities such as dust and water can be prevented from entering from the outside and the collapse load can be controlled by the supporting force with the outer axial grooves 303 when the vehicle is in a collision.

The contact member 313 is provided with a small diameter portion 313d whose diameter is reduced at an axial end thereof and coupling protrusions 313b formed to radially protrude from the outer circumference side of the small diameter portion 313d, so that when the collapse is performed while the contact member 313 is supported by the shaft member 301, the contact member 313 is not pushed in the direction in which it is disengaged or inserted by the support member 317.

The support member 317 is provided with an inner end portion 317d whose diameter is reduced so as to be seated on the small diameter portion 313d of the contact member 313 at an axial end portion thereof, and the inner end portion 317d is provided with insertion grooves 317b into which the coupling protrusions 313b of the contact member 313 are inserted, respectively.

Therefore, when the contact member 313 and the support member 317 are coupled to each other, it is easy to confirm the coupling position and the coupling force is increased. When the collapse is performed while the contact member 313 is supported by the shaft member 301, the contact member 313 is not pushed by the support member 317 in the direction in which the contact member is disengaged or inserted.

The contact member 313 may have seating grooves 313c each formed between the coupling protrusions 313b and the support member 317 may have support end portions 317c formed to be bent axially outward to be supported on the seating grooves 313c of the contact member 313. Therefore, when collapse is performed and thus the shaft member 301 is inserted into the first outer member 310 when the vehicle is in a collision, the support end portions 317c of the support member 317 are engaged with the seating grooves 313c of the contact member 313, so that the contact member 313 can be supported in the circumferential direction and the axial direction.

The support member 317 is provided with elastic support portions 317a, which are connected to and supported by the outer circumferential surface of the support member 317 at one end of the support member 317 and are slit in the axial and circumferential directions so as to be elastically deformed in the radial direction. Support grooves 311 are formed on the outer circumferential surface of one end of the first outer member 310 such that the elastic support portions 317a are seated in and supported by the support grooves 311, respectively.

Thus, when the vehicle is in a collision and thus collapse is performed such that the shaft member 301 is inserted into the first outer member 310, the elastic support portions 317a of the support member 317 are engaged with and supported by the support grooves 311 in the first outer member 310. Thus, the support member 317 is neither disengaged from the first outer member 310 nor pushed in the axial direction.

Further, a second load control member 325 may be further included for controlling the collapse load of the first outer member 310 and the second outer member 320 when the vehicle is in a collision.

That is, the second load control member 325 is coupled to the outer circumferential surface of the first outer member 310, and when the collapse motion in which the first outer member 310 is inserted into the second outer member 320 is performed due to the collision of the vehicle, the second load control member 325 is in close contact with and is supported by the outer circumferential surface of the first outer member 310, thereby controlling the collapse load.

The second load control member 325 is formed of an elastic material in an annular shape and is coupled to a fixing groove 314 formed on the outer circumferential surface of the first outer member 310. Thus, when the vehicle is in a collision, the second load control member 325 is in close contact with and is supported by the outer circumferential surface of the first outer member 310 while being supported by one end of the second outer member 320, thereby controlling the collapse load.

Meanwhile, instead of the annular second load control member 325, a second load control member 350 configured to control the collapse load of the first outer member 310 and the second outer member 320 when the vehicle is in a collision may be provided, as illustrated in FIGS. 9 to 13.

That is, the second load control member 350 illustrated in FIGS. 9 to 13 is coupled to one end of the second outer member 320, and when the collapse motion in which the first outer member 310 is inserted into the second outer member 320 is performed due to the collision of the vehicle, the second load control member 350 is in close contact with and is supported by the outer circumferential surface of the first outer member 310, thereby controlling the collapse load.

The second load control member 350 includes an annular contact member 353 having contact support portions 353a provided on the inner circumferential surface thereof to be in close contact with and to be supported by the outer circumferential surface of the first outer member 310, and an annular support member 357, one end of which is coupled to the outer circumferential side of the contact member 353 and the other end of which is coupled to the outer circumferential surface of the second outer member 320.

The contact member 353 is configured such that a contact support portion 353a is in close contact with and is supported by the outer circumferential surface of the first outer member 310, so that impurities such as dust and water can be prevented from entering from the outside and the collapse load can be controlled by the supporting force with the outer circumferential surface of the first outer member 310 when the vehicle is in a collision.

The contact member 353 is provided with coupling protrusions 353b formed to radially protrude from the outer circumference side of the contact support portion 353a, so that when the collapse is performed while the contact member 353 is supported by the first outer member 310, the contact member 353 is not pushed in the direction in which it is disengaged or inserted by the support member 357.

The support member 357 is provided with an inner end portion 357d whose diameter is reduced so as to be seated on the contact support portions 353a at an axial end portion thereof, and the inner end portion 357d is provided with insertion grooves 357b into which the coupling protrusions 353b of the contact member 353 are inserted, respectively.

Therefore, when the contact member 353 and the support member 357 are coupled to each other, it is easy to confirm the coupling position and the coupling force is increased. When the collapse is performed while the contact member 353 is supported by the first outer member 310, the contact member 353 is not pushed by the support member 357 in the direction in which the contact member is disengaged or inserted.

The contact member 353 may have seating grooves 353c each formed between the coupling protrusions 353b and the support member 357 may have support end portions 357c formed to be bent axially outward to be supported on the seating grooves 353c of the contact member 353. Therefore, when collapse is performed and thus the first outer member 310 is inserted into the second outer member 320 when the vehicle is in a collision, the support end portions 357c of the support member 357 are engaged with the seating grooves 353c of the contact member 353, so that the contact member 313 can be supported in the circumferential direction and the axial direction.

The support member 357 is provided with elastic support portions 357a, which are connected to and supported by the outer circumferential surface of the support member 357 at one end of the support member 357 and are slit in the axial and circumferential directions so as to be elastically deformed in the radial direction. Support grooves 361 are formed on the outer circumferential surface of one end of the second outer member 320 such that the elastic support portions 357a of the support member 357 are seated in and supported by the support grooves 361, respectively.

Thus, when the vehicle is in a collision and thus collapse is performed such that the first outer member 310 is inserted into the second outer member 320, the elastic support portions 357a of the support member 357 are engaged with and supported by the support grooves 361 in the second outer member 320. Thus, the support member 357 is neither disengaged from the second outer member 320 nor pushed in the axial direction. According to the embodiments having the structure and shape described above, when the vehicle is in a collision, the contraction amount of the entire length of the intermediate shaft is increased compared to a conventional one, and thus collapse can be sufficiently performed, thereby absorbing more impact energy.

Further, according to the embodiments, the axial expension or contraction amount of the intermediate shaft is increased compared with a conventional one, and thus the entire volume of the intermediate shaft becomes smaller, so that the movement in an assembling process can be facilitated and the number of products supplied to an assembly line can be increased, so that the assembly process can be shortened.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering apparatus for a vehicle, the steering apparatus comprising:
    a shaft member having a yoke provided at one end thereof and several outer axial grooves provided on an outer circumferential surface of a sliding section;
    a first outer member having a hollow shape, wherein a remaining end of the shaft member is slidably inserted into one end of the first outer member and the first outer member has first serration portions axially formed on an outer circumferential surface of a remaining end thereof and several inner axial grooves formed on an inner circumferential surface thereof to correspond to the outer axial grooves of the shaft member;
    a second outer member having a hollow shape, wherein the remaining end of the first outer member is slidably inserted into one end of the second outer member, and the second outer member has second serration portions axially provided on an inner circumferential surface thereof to correspond to the first serration portions of the first outer member, and a yoke provided on the remaining end thereof;
    a first load control member coupled to the one end of the first outer member and configured to control a collapse load by being in close contact with and being supported by the outer axial grooves on the shaft member when a collapse motion in which the shaft member is inserted into the first outer member is performed when the vehicle is in a collision,
    wherein the first load control member comprises:
        an annular contact member having contact protrusions provided on an inner circumferential surface thereof to be in close contact with and to be supported by the outer axial grooves of the shaft member; and
        an annular support member, one end of which is coupled to an outer circumferential side of the contact member and a remaining end of which is coupled to the outer circumferential surface of the first outer member, and
    wherein the contact member is provided with a small diameter portion whose diameter is reduced at an axial end thereof, and one or more coupling protrusions formed to radially protrude are provided on an outer circumference side of the small diameter portion.

2. The steering apparatus of claim 1, wherein the support member is provided with an inner end whose diameter is reduced so as to be seated in the small diameter portion at an axial end thereof, and one or more insertion grooves, into which the coupling protrusions are inserted, are formed on the inner end.

3. The steering apparatus of claim 2, wherein the contact member has a seating groove formed between adjacent coupling protrusions.

4. The steering apparatus of claim 3, wherein the support member has a support end bent axially outward to be supported on the seating grooves on the contact member.

5. The steering apparatus of claim 4, wherein the support member has an elastic support portion, one end portion of which is connected to and supported by another circumferential surface of the support member, the elastic support portion being slit in an axial direction and a circumferential direction thereof so as to be elastically deformed in a radial direction thereof.

6. The steering apparatus of claim 5, wherein the first outer member has a support groove formed on an outer circumferential surface of one end thereof, the elastic support portion being seated in and supported by the support groove.

7. The steering apparatus of claim 6, further comprising:
    a second load control member coupled to the remaining end of the first outer member and configured to control a collapse load by being in close contact with and being supported by the outer circumferential surface of the first outer member when a collapse motion in which the first outer member is inserted into the second outer member is performed when the vehicle is in a collision.

8. The steering apparatus of claim 7, wherein the second load control member is formed of an annular elastic material, and a fixing groove to which the second load control member is coupled is formed in the outer circumferential surface of the first outer member.

9. The steering apparatus of claim 1, wherein the second outer member is provided with a compressive plastic deformation portion configured to press and plastically deform the outer circumferential surface of a portion where the second serration portions are formed, to a radial center portion thereof.

10. The steering apparatus of claim 9, wherein one or more compressive plastic deformation portions are provided at each of radially opposed symmetrical positions with respect to a center portion of the second outer member.

* * * * *